July 15, 1969  L. N. WOOD  3,455,150

ULTRASONIC INSPECTION APPARATUS

Filed March 2, 1966  4 Sheets-Sheet 1

INVENTOR.
LEO N. WOOD

BY Fulwider, Patton, Rieber
Lee, and Utecht

ATTORNEYS

July 15, 1969

L. N. WOOD 3,455,150

ULTRASONIC INSPECTION APPARATUS

Filed March 2, 1966

INVENTOR.
LEO N. WOOD

BY Fulwider, Patton, Rieber,
Lee, and Utecht

ATTORNEYS

United States Patent Office 3,455,150
Patented July 15, 1969

3,455,150
ULTRASONIC INSPECTION APPARATUS
Leo N. Wood, 5801 Cardale,
Lakewood, Calif. 90713
Filed Mar. 2, 1966, Ser. No. 531,212
Int. Cl. G01n 9/24, 29/04
U.S. Cl. 73—71.5                                17 Claims

ABSTRACT OF THE DISCLOSURE

Ultrasonic inspection apparatus for inspecting elongated elements such as tubing, and including a plurality of transducers rotatable about said tubing and mounted for automatic inward and outward movement according to changes in diameter of the tubing, the rotating transducers being capacitively coupled to the stationary portions of the apparatus to eliminate high level noise signals.

---

The present invention relates to improvements in ultrasonic inspection equipment and, more particularly, to an improved ultrasonic inspection apparatus for detecting discontinuities in tubular and cylindrical bars, and the like.

Ultrasonic inspection apparatus for detecting and locating cuts, cracks and other discontinuities and surface irregularities in tubular and cylindrical bars generally includes equipment for supporting a bar in a liquid bath, and ultrasonic transducers directed at the bar and connected to electrical pulse transmitting and receiving equipment.

In operation, electrical pulses generated by the transmitting equipment energize the transducers to transmit supersonic pulses through the liquid into the bar. If there is a fault in the bar constituting a discontinuity, ultrasonic vibrations are reflected back to the transducers. The transducers convert the vibrations into electrical pulses which when received by the receiving equipment produce an indication of the fault, usually by a display of the reflected pulses on an oscilloscope. Knowing the time of generation of the pulses and the speed thereof in traveling and returning to the signal receiving equipment, the location of the discontinuity may be readily determined.

In order to inspect the entire surface of the bar, it is general practice to rotate the bar as it moves forward through the bath. This allows the sonic pulses generated by the transducers to effectively scan the entire surface of the bar. Unfortunately, the supporting equipment for rotating and advancing the bar requires special design and is rather complex and expensive. Furthermore, it is exceedingly difficult, if not impossible, for such equipment to completely control the motion of flexible bars which when rotating tend to flex and vibrate in passing through the bath. The vibration of the flexible bars renders indications of discontinuities effectively meaningless. For, these reasons, it has been literally impossible using such equipment to accurately detect discontinuities in flexible bars. In addition, conventional ultrasonic inspection equipment is incapable of moving and inspecting bars of varying diameters.

In an attempt to overcome the shortcomings of conventional ultrasonic inspection equipment, apparatus has been developed wherein the transducers are rotated around the bar as the bar is moved forward through the liquid bath. Although such apparatus materially simplifies the bar guiding and driving units and effectively eliminates the problems of bar vibration, it requires special mounting for the transducers which heretofore has been extremely complex and expensive. Also, special coupling means are necessary to electrically connect the rotating transducers to the stationary pulse transmitting and receiving equipment. Such coupling means generally include some form of slip-ring combination which in use develops high level noise signals materially impairing the accuracy of the apparatus. Furthermore, ultrasonic inspection equipment employing rotating transducers are presently designed to handle and inspect single, uniform diameter bars. The inspection of different or varying diameter bars therefore requires the shut down of the apparatus at each change in bar diameter and the time consuming repositioning of the transducers relative to the bar and the adjustment of the bar drive and guiding units. For these and other reasons, ultrasonic inspection equipment employing rotating transducers have found only limited use to date.

Accordingly, it is a primary object of the present invention to provide an improved ultrasonic inspection apparatus which employs rotating transducers and which overcomes the disadvantages of prior apparatus of this type while maintaining intact all the inherent advantages.

It is another object of the present invention to provide a rotating transducer-type ultrasonic inspection apparatus which is self-adjustable to inspect tubular and cylindrical bars of different and varying diameter.

A further object of the present invention is to provide ultrasonic inspection equipment of the foregoing character which is simple in design and reliable and extremely accurate in its operation.

Still another object of the present invention is to provide an ultrasonic inspection apparatus which employs a capacitive coupling-type electrical connector between its rotating transducers and the pulse generating and receiving equipment for the apparatus.

A still further object of the present invention is to provide an ultrasonic inspection apparatus of the foregoing character which permits the simultaneous use of multiple transducers in one operation.

The foregoing as well as other objects and advantages of the present invention may be more clearly understood by reference to the following detail description when considered with the drawings which, by way of example only, illustrate a form of ultrasonic inspection apparatus embodying the features of the present invention.

Figure 9:
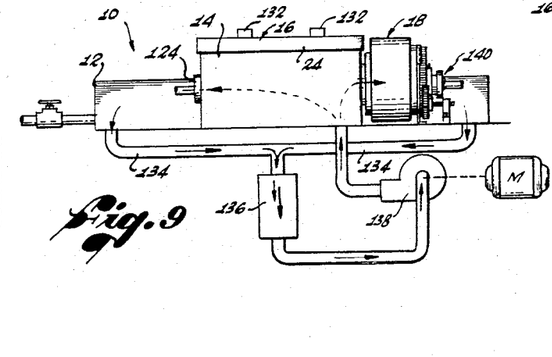
FIGURE 9 is a schematic of the fluid supply system for the inspection apparatus.

In the drawings, the ultrasonic inspection apparatus is represented generally by the numeral 10 and basically includes a trough 12 holding a quantity of liquid 14, such as an oil (see FIGURE 9). The trough provides base support for a housing 16, the stationary portion 17 of a capacitive coupling-type electrical connector unit 18, and a pair of bar driving units 20 and 22.

Bar driving unit 20 is located at the left side of the housing 16 and is adapted to drive a bar of varying diameter along a straight longitudinal axis 23 into the housing and the connector unit while the driving unit 22 is located at the right side of the connector unit and is adapted to draw the bar from the housing and the connector unit.

The housing 16 defines a fluid confining chamber 24 having a rotatable frame 26 stationed therein. The frame 26 is connected at its right end to the rotatable portion 19 of the electrical connector unit 18, is rotatable about the axis 23, and supports a pair of bar guiding units 28 and 30 and a transducer 32 for turning about the axis 23.

The guide units 28 and 30 are connected to the left and right ends of the frame 26 and are adapted to guide a bar of varying diameter along the axis 23 through the chamber 24 while the transducer 32 is self-adjustable to maintain proper positioning with respect to bars of different and varying diameter.

Basically, in operation, rotational motion is imparted to the rotatable portion 19 of the electrical connector unit 18 to turn the frame 26, the guide units 28 and 30, and the transducer 32 about the axis 23. Simultaneously, the driving unit 20 drives a bar into the chamber 24 along the axis 23 where it is guided by the units 28 and 30 through the chamber and into and through the electrical connector unit 18. Upon reaching the driving unit 22, the bar is drawn from the chamber and through the electrical connector unit. As the bar travels along the axis 23, the driving units 20 and 22, the guide units 28 and 30, and the transducer 32 automatically adjust for any variations in the diameter of the bar to maintain the bar straight along the axis 23 and the transducer in proper alignment therewith.

As the bar moves through the chamber 24, electrical pulses are generated by equipment (not shown) connected to the stationary portion 17 of the electrical connector unit 18. The electrical pulses are capacitively coupled to the rotating portion 19 and applied to the transducer 32. The transducer 32 converts the pulses into supersonic pulses and transmits the pulses through the liquid 14 to the surface of the bar. Since the transducer is rotating around the bar, the sonic pulses effectively scan the entire surface of the bar. Within the bar, the sonic pulses set up ultrasonic vibrations which upon encountering any discontinuity in the bar are reflected back through the liquid to the transducer 32. In the transducer, the vibrations are converted into electrical pulses and applied to the rotating portion 19 of the electrical connector unit 18. The electrical pulses are capacitively coupled to the stationary portion 17 and applied to receiving equipment (not shown) to provide an indication of the discontinuity and the location thereof in the bar, generally by a display of the reflected pulses on an oscilloscope.

By capacitively coupling the pulses to and from the transducer 32, noise problems inherent in prior ultrasonic inspection equipment are effectively eliminated. Also, since the driving units, guiding units, and transducer of the ultrasonic inspection apparatus are automatically adjustable to compensate for variations in the diameter of the bar, bars of different and varying diameter may be rapidly fed through the apparatus 10 and inspected without requiring a shutdown of the apparatus or special repositioning of any of its component parts.

More particularly, in the illustrated form of the apparatus 10, the trough 12 is a shallow, open boxlike receptacle having holes coaxial with the axis 23 for receiving and supporting a tubular or cylindrical bar as it passes into and through the ultrasonic inspection apparatus.

An instrument panel 36 extends forward from the front side of the trough 12 and supports various knobs and dials for controlling the application, and monitoring the value, of electrical power to the apparatus 10.

Figures 1, 2:
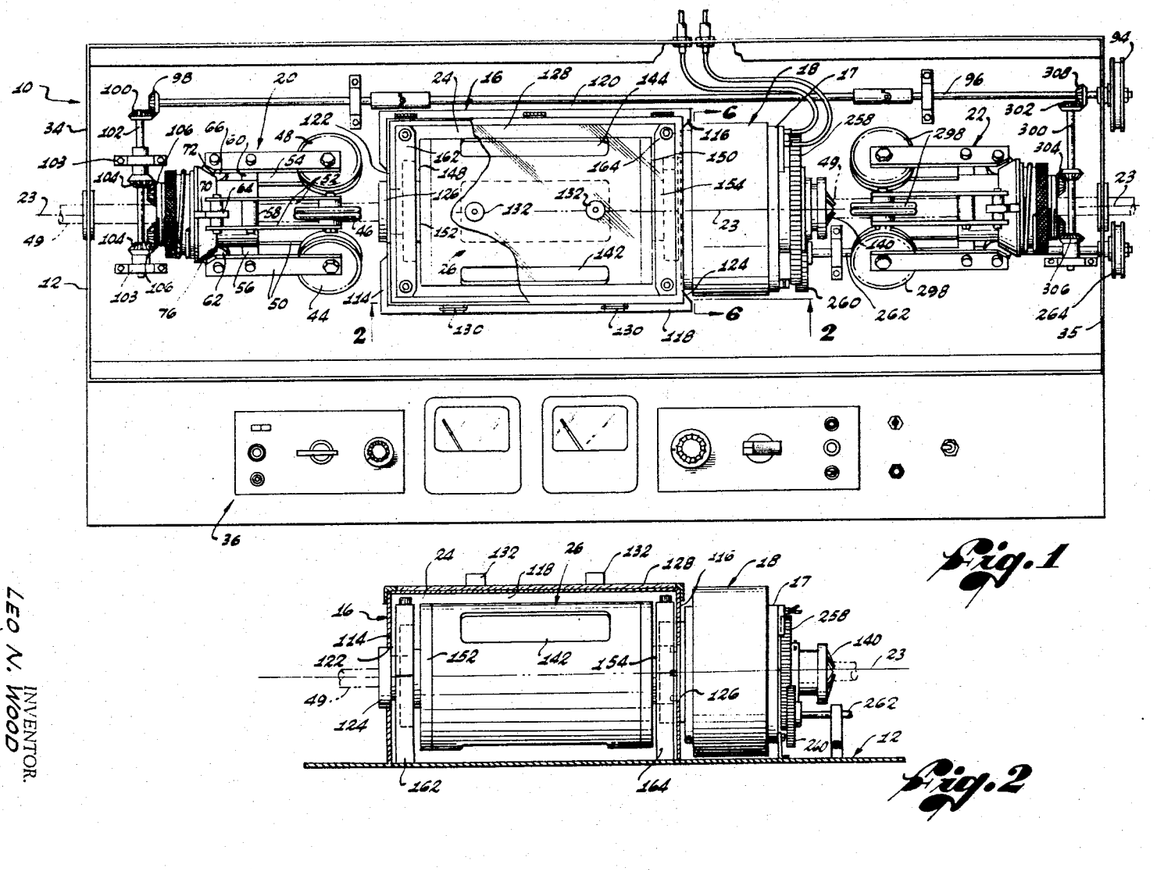
FIGURE 1 is a top view of the ultrasonic inspection apparatus.
FIGURE 2 is a fragmentary sectional side view taken along the line 2—2 in FIGURE 1.
Figure 4:
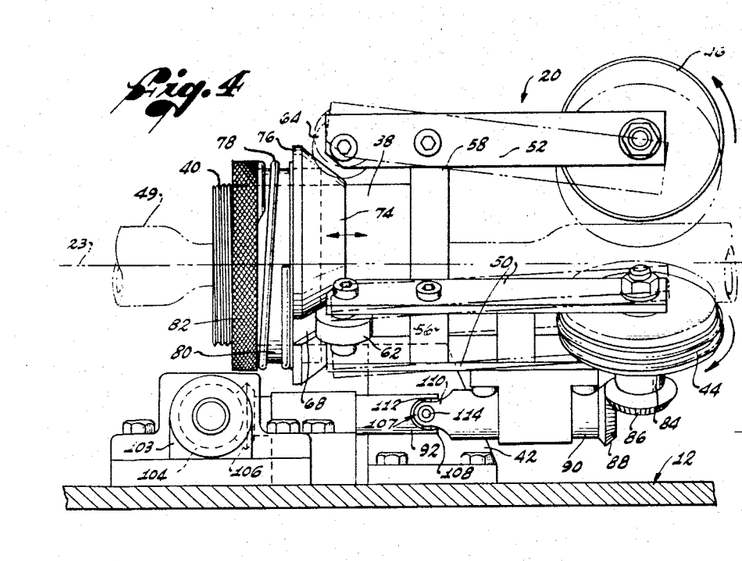
FIGURE 4 is a side view of one of the bar drive units for the apparatus.

Within the trough 12, the bar driving unit 20 is aligned with the entry hole in the side 34 and as most clearly illustrated in FIGURES 1 and 4 includes a horizontally extending, tubular slide member 38. The slide member 38 is threaded at its left end 40 and connected by a mounting bracket 42 to the bottom of the trough coaxial with the axis 23.

In addition to the slide member 38, the driving unit 20 includes three rollers 44, 46 and 48 extending radially from the axis 23 and spaced equidistant from each other. The rollers 44, 46 and 48 are adapted to engage the outer surface of a cylindrical, varying diameter bar 49, to turn and drive the bar through the driving unit 20 along the axis 23, and to radially expand and contract relative to each other with variations in the diameter of the bar—the rollers continuously bearing against the bar and the roller 46 riding along the topmost surface of the bar.

In this respect, the rollers 44, 46 and 48 are supported for rotation between the right ends of pairs of parallel arms 50, 52 and 54, respectively. The pairs of arms 50, 52 and 54 are pivotally connected between their ends to radial projections 56, 58 and 60 spaced equidistant from each other and extending from the right end of the slide member 38. The left ends of the pairs of arms carry guide rollers 62, 64 and 66 for riding within radially extending slots 68, 70 and 72 in the outwardly and forwardly inclined surface 74 in an annular wedge 76. The wedge 76 is stationed around and mounted for sliding movement along the slide member 38 and is continuously urged rearward toward the right end of the slide member 38 by a coil spring 78. The spring 78 is wound around an internally threaded sleeve 80 and bears against an annular shoulder 82 thereof and against the left or front edge of the wedge. The sleeve 80 screws onto the threaded end 40 of the slide member 38, acts as a stop for the wedge 76, and provides means for adjusting the spring force exerted on the wedge by screwing onto and off of the threaded end of the slide member. In this manner, the guide rollers 62, 64 and 66 are normally urged up inclined slots in the wedge 76 and pivot the rollers 44, 46 and 48 inwardly toward the axis 23 to tightly engage the outer surface of the varying diameter bar 49 as it is fed along the axis and through tubular slide member 38.

In order to drive the varying diameter bar 49 into and through the housing 16, means are provided for turning the rollers 44 and 48 in counterclockwise directions (when viewed from the top). In the illustrated form, such means comprise driven stub shafts 84 extending from the axles of the rollers 44 and 48 and carrying bevel gears 86. The bevel gears 86 mate with bevel gears 88 on connecting shafts 90 which are carried and bearing-supported by the arms 50 and 54 to extend between the stub shafts and drive shafts 92.

The drive connection to the drive shafts 92 is most clearly illustrated in FIGURE 1 and includes a drive pulley 94 connected to the right side of the trough 12 and to a drive motor (not shown). The pulley 94 is carried on a long shaft 96 which terminates in a bevel gear 98. The bevel gear 98 mates with a bevel gear 100 carried by a cross shaft 102. The cross shaft 102 is bearing mounted at 103 above the bottom of the trough 12 and carries a pair of bevel gears 104 mating with bevel gears 106 connected to the left ends of drive shafts 92. Hence, a turning of the pulley 94 produces a simultaneous turning of the drive gears 92 to impart a clockwise rotation to the rollers 44 and 48 to drive the bar 49 between the rollers and into the housing 16.

It is, of course, important that the drive provided by the rollers 44 and 48 be continuous with inward and outward movement of the rollers in following changes in the diameter of the bar 49. To accomplish this, the left ends of the connecting shafts 90 are connected by universal couplings 107 to the right ends of the drive shafts 92. Here the universal couplings include bifurcated ends 108 and 110 of the drive shafts 92 and connecting shafts 92 and cross connected pins 112 and 114 pivotally connected to the side arms of the bifurcated end portions. Thus arranged, as the rollers 44 and 48 move in and out with changes in the diameter of the bar 49, the connecting shafts 90 move with the arms 50 and 54 and swing about the universal couplings 107 to maintain the bevel gears 88 in driving contact with the bevel gears 86. Continuous rotation of the drive shafts 92 therefore impart continuous rotation to the rollers 44 and 48 with movement of the rollers toward and away from the axis 23 to drive the varying diameter bar 49 into and through the housing 16.

As illustrated most clearly in FIGURES 1 and 2, the housing 16 includes left, right, front and back walls 114, 116, 118 and 120 extending vertically from the bottom of the trough 12 to define a fluid confining chamber 24. The left and right walls 114 and 116 include ports 122 and 124 coaxial with the axis 23 for receiving the bar 44 as it passes from the driving unit 20. A slotted diaphragm-type seal 126 is stationed within the port 122 to receive the bar 49 with a minimum of fluid leakage from the chamber 24 into the main body of the trough 12 while the port 124 is enlarged relative to the port 122 and adapted to receive connecting apparatus between the rotatable frame 26 and the electrical connector unit 18, as will be hereinafter described.

The open top of the housing 16 is adapted to be covered and sealed by a door 128 hinged to the back wall 120 and releasably secured at the front wall 118 by a pair of catches 130. The door 128 carries a pair of adjustable bleed valves 132 for regulating the flow of air from the chamber 124 as fluid is pumped thereto prior to and during operation of the ultrasonic inspection apparatus 10.

In particular, referring to FIGURE 9, fluid from the trough 12 passes through bottom openings into tubes 134, through a filter 136 and is forced by a motor driven pump 138 into the bottom of the chamber 24. Fluid flow from the chamber is limited by the slotted diaphragm 126 at the left wall of the housing 16 and by a similar slotted diaphragm-type seal 140 connected over the open end of the electrical connector unit 18. Thus, the fluid passing from the pump 138 rises within the chamber 24 at a rate determined in part by the size of the apertures provided by the bleed valves 132 to allow air to escape from the chamber. Upon reaching the door 128, the rate at which fluid is pumped into the chamber 24 may be controlled (by means not shown) and the bleed valves closed to allow a positive fluid pressure to build up within the chamber. As the fluid pressure builds up within the chamber, fluid leaks from the chamber into the trough 12 through the slotted diaphragms 126 and 140 and during rotation of the frame 26 carries all air bubbles from the chamber which might otherwise interfere with the ultrasonic inspection.

Figure 3:
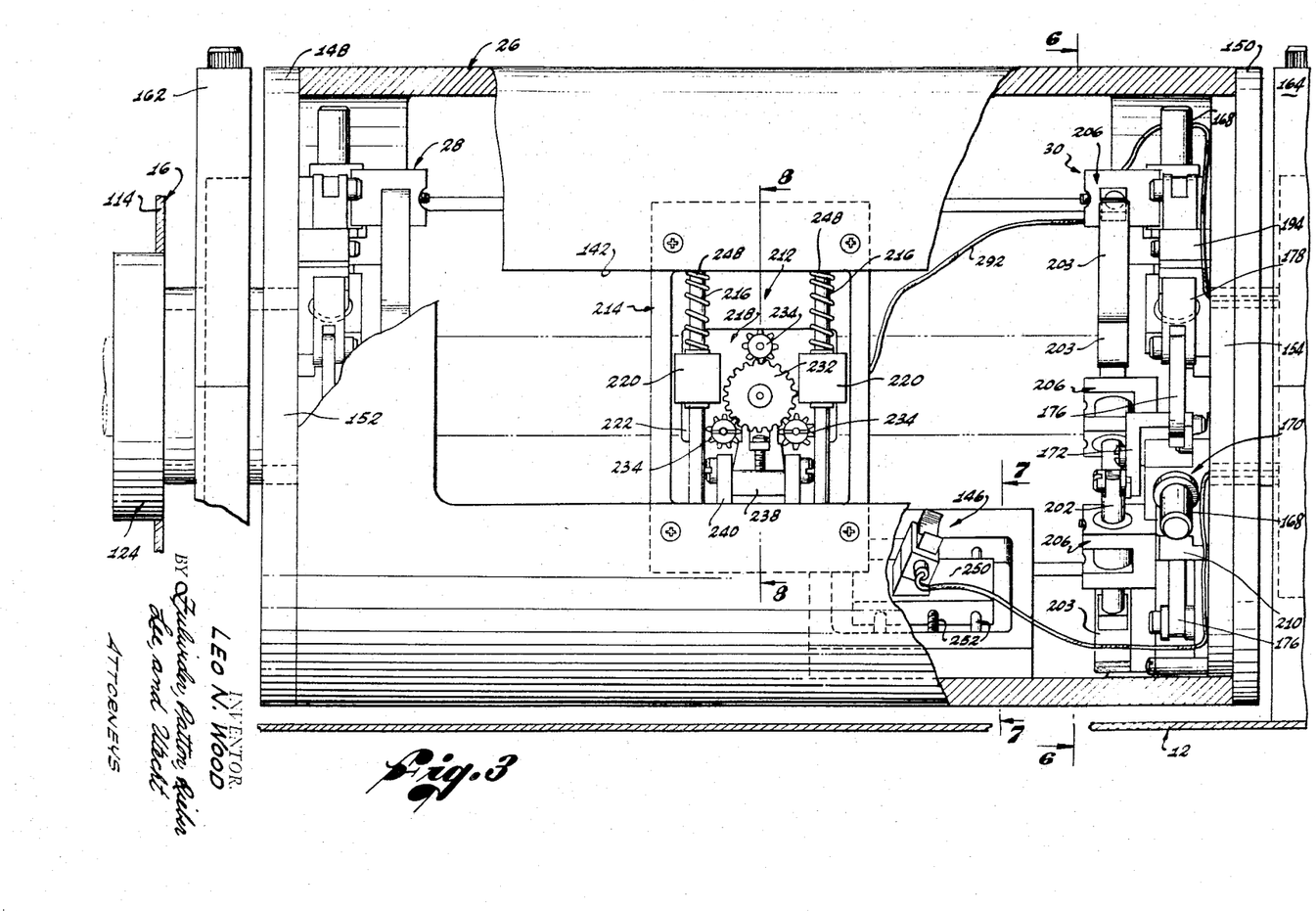
FIGURE 3 is a fragmentary sectional side view of the central housing of the apparatus supporting the rotating transducers.
Figure 5:
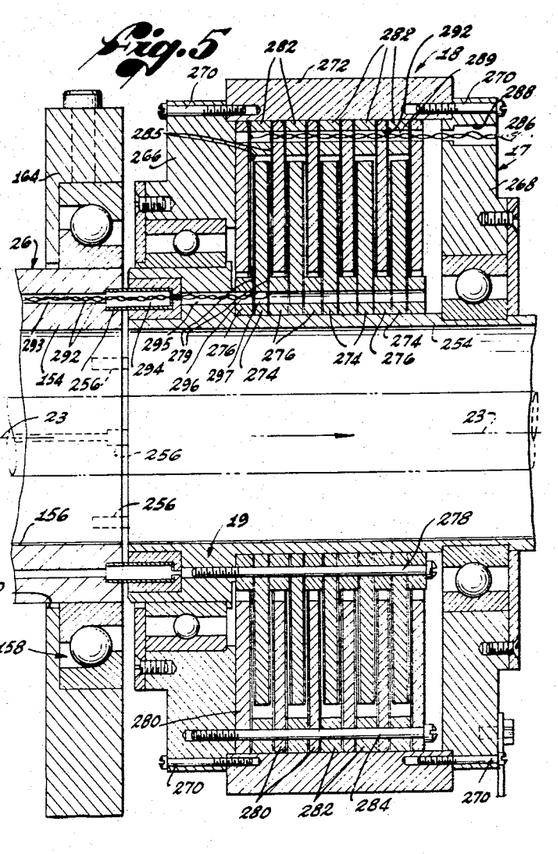
FIGURE 5 is a sectional side view of the electrical connector unit between the transducers and the pulse transmitting and receiving equipment for the apparatus.

The frame 26 is most clearly represented in FIGURES 1, 2 and 3 and its mode of rotational mounting within the housing 16 in FIGURE 5. As illustrated, the frame 26 is generally cylindrical in shape having elongated side openings 142 and 144 for receiving the ultrasonic transducer 32 and a second transducer 146. End covers 148 and 150 extend over the right and left ends of the frame 26 and collars 152 and 154 extend axially therefrom and around central bar receiving openings 156 coaxial with the axis 23. The collars 152 and 154 in turn, are bearing mounted by conventional ball bearing units 158 within axial holes 160 in stationary mounting blocks 162 and 164 extending upward from the bottom of the trough 12 at the left and right walls of the housing 16. In this manner, the frame 26 is supported within the chamber for rotation about the axis 23 as the bar 49 is moved along the axis by the driving units and guided within the chamber 26 by the guiding units 28 and 30.

The guiding units 28 and 30 are connected to the left and right ends of the frame 26 and are mirror images of each other. Therefore, only the guiding unit 30 is illustrated in detail in FIGURES 3 and 6 and described fully herein.

Figure 6:
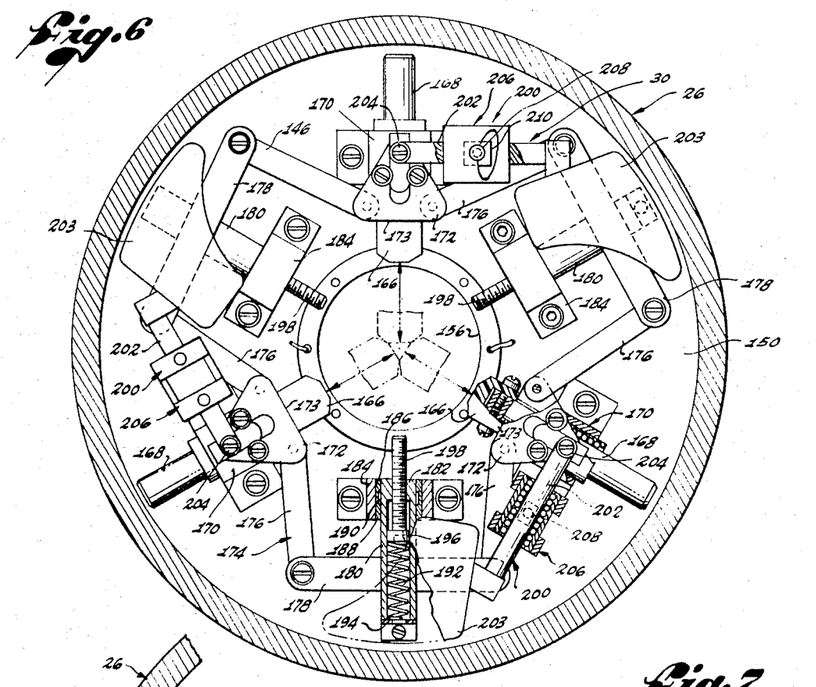
FIGURE 6 is a fragmentary sectional view taken along the line 6—6 in FIGURES 1 and 3 illustrating one of the bar guide units for the apparatus.

As illustrated, the guiding unit 30 comprises three shoes 166 extending radially from the axis 23 and spaced equidistant from each other. The shoes 166 are carried on the inner ends of radial guide rods 168 which, in turn, are supported for radial sliding movement within slide bearing mounts 170 fixed to the right end cover 152 for the cylindrical frame 26. A triangular connecting block 172 is connected to each guide rod 168 with a flat base 173 generally normal to a radius extending from the axis 23. In the guiding unit 30, the connecting blocks 172 provide connection for a linkage assembly 174 to the guide rods 168. In brief, the linkage assembly 174 is adapted to continuously act upon the guide rods 168 and urge the shoes 166 radially inward toward the axis 23 to engage the outer surface of the bar 49 such that the bar in passing into and through the chamber 24 is guided straight along the axis 23. In addition, the linkage assembly 174 is constructed to lock and prevent opening and closing of the shoes 166 when different forces are applied to different shoes thereby maintaining alignment of the bar 49 along the central axis 23 with rotational movement of the guiding unit 30 and frame 26 within the chamber 24.

More particularly, the linkage assembly 174 comprises three pairs of equal length first arms 176 and three equal length second arms 178. The arms 176 of each pair are each pivotally connected at one end to a different base corner of a different one of triangular connecting blocks 172 for swinging movement in a vertical plane normal to the direction of the axis 23. The second arms 178 lie normal to radii extending from the axis 23 and are each pivotally connected at opposite ends to the free ends of different first arms 176 associated with adjacent guide rods 168.

Connected to the middle of each second arm 178 and extending radially inward toward the axis 23 is a hollow rod 180 having an internally threaded inner end 182. Each rod 180 is supported for inward and outward radial sliding movement within a slide bearing mount 184 fixed to the end cover 152 and including a radial bore 186 having a sleeve bearing 188 captured therein. Each sleeve bearing 188 includes a central annular recess 190 such that the rods 180 are supported within the bearings at the inner and outer radial ends thereof. As will be described hereinafter, this arrangement insures linear sliding movement of the rods 180 within the sleeve bearings despite wearing of the bearings caused by rotational forces exerted on the rods 180.

Stationed within the hollow outer end of each rod 180 is a coil spring 192. The coil springs 192 are captured between and bear against stop members 194 connected to the end cover 152 and against Teflon plugs 196 seated within the hollow rods 180. The plugs 196 are on the outer ends of screws 198 extending through and mating with the threaded ends 182 of the rods 180. The screws 198 extend radially from the axis 23 and a turning thereof controls the compression of the springs 192 and hence the value of the inward radial forces exerted thereby on the rods 180 and second arms 178 of the linkage assembly 174.

The inward radial forces developed by the coil springs 192 on the rods 180 and second arms 178 produce inward forces on the guide rods 168 to continuously urge the shoes 166 toward the axis 23 and against the outer surfaces of the bar 49. The spring forces also maintain the shoes 166 in contact with the outer surface of the bar 49 as it changes diameter or as different bars of different diameters are fed into the apparatus 10 through the chamber 24.

In particular, as the diameter of the bar 49 increases, equal outward radial forces are exerted on the shoes 166 causing the shoes to move radially away from the axis 23. The outward radial forces exerted on the shoes 166 cause the guide rods 168 to slide outwardly in the slide bearing mounts 170 and to develop equal forces on the first arms 176 connected thereto. The forces exerted on the first arms 176 are transmitted to the ends of the second arms 178 to cause the second arms to move radially away from the axis 23 with the rods 180 sliding smoothly within the slide bearings 184. The outward movement of the second arms 178 is resisted by the coil springs 192 which continue to develop inward forces on the guide rods 168 and on the shoes 166 holding the shoes firmly against the outer surfaces of the bar 49.

The reverse operation occurs when the diameter of the bar 49 decreases and the shoes 166 move radially inward toward the axis 23 in contact with the outer surface of the bar.

If different radial forces are exerted on the shoes 166 during operation of the ultrasonic inspection apparatus 10 and rotation of the frame 26, different forces are likewise transmitted to and exerted on the opposite ends of the second arms 178 in the linkage assembly 174. This produces bending moments on the rods 180 within the slide bearing mounts 184 which are resisted by the inner and outer ends of the sleeve 188 contacting the rods. The traverse forces of the rods 180 on the ends of the sleeve bearings 188 lock the rods in place within the bearings to prevent sliding movement of the guide rods 168 and to maintain an equal separation for the shoes 166 with the bar 49 aligned straight along the axis 23.

The bending moments exerted on the rods 180 have a tendency to wear the inner and outer ends of the sleeve bearings 188. However, such wear does not create high spots at the center of the sleeve bearings 188 over which the rods 180 might rock to produce nonradial movement of the rods and undesired binding of the linkage assembly 174. This is prevented by the central recesses 190 within the sleeve bearings 188 which thereby insure linear radial movement of the rods 180 despite slight wearing of the inner and outer support ends thereof.

In all rotational systems, as the annular velocity of a body increases, the centrifugal force acting on the body away from the axis of rotation increases. This is particularly true in the guiding units 28 and 30 wherein the centrifugal forces acting on the shoes 166 away from the axis 23 increase as the angular velocity of the frame 26 increases. This means that as the frame 26 rotates, outward forces are exerted on the shoes 166 which tend to force the shoes away from the surface of the bar 49. As the angular velocity increases, these forces increase.

To counteract the varying centrifugal forces acting on the shoes 166, the linkage assembly 174 includes three counterbalancing units 200. Each unit 200 comprises an arm 202 connected at one end to a weight 203 and pivotally connected at an opposite end by a pin member 204 to a guide rod 168 for swinging movement in a plane parallel to the guide rod. Each arm 202 is mounted for longitudinal sliding movement in a slide bearing mount 206 which in turn is pivotally connected for swiveling movement about a pin member 208 extending from the base of the mount into a mounting block 210 connected to the end cover 152 for the frame 26.

In operation, as the frame 26 starts to rotate, centrifugal forces are developed on the shoes 166 and weights 203. The forces on the shoes 166 tend to force the shoes and guide rods 168 radially outward away from the axis 23. As this occurs, the arms 202 tend to slide longitudinally through the slide bearing mounts 206 and the slide bearing mounts to swivel in clockwise directions (when viewed in FIGURE 6). At each unit 200, this tends to decrease the length of the arm 202 between the pivot pin 208 and the pivot pin 204 and to increase the length of the arm between the pivot pin 208 and the weight 203. The increase in the length of the arm 202 between the pivot pin 208 and the weight increases the counterclockwise moment of rotation developed by the weight 203 on the arm 202, to resist and conteract the centrifugal force on the shoe 166 associated with the unit 200. In this manner, the counterbalance units 200 develop inward forces on the guide rods 168 and shoes 166 which counteract the increasing centrifugal forces acting on the shoes as the frame 26 rotates about the axis 23.

Similarly, as the rotational velocity of the frame 26 decreases, the centrifugal forces acting on the shoes and guide rods decrease and the guide rods and shoes tend to move inwardly toward the axis 23 under the force of the springs 192. As this occurs, the arms 202 pivot about the pin members 208 and slide within the bearing mounts 206 with the inward movement of the guide rods 168. This lengthens the arms 202 between the pivot pins 204 and 208 and shortens the arm between the pivot pins 208 and the weights 203 to reduce the counterclockwise rotational forces acting on the guide rods 168 to maintain a balance between the forces developed by the counterbalance units and the centrifugal forces. In this manner, the forces exerted by the shoes 166 on the surface of the bar 49 are maintained substantially constant independent of the rotational velocity of the frame 26.

Figure 8:
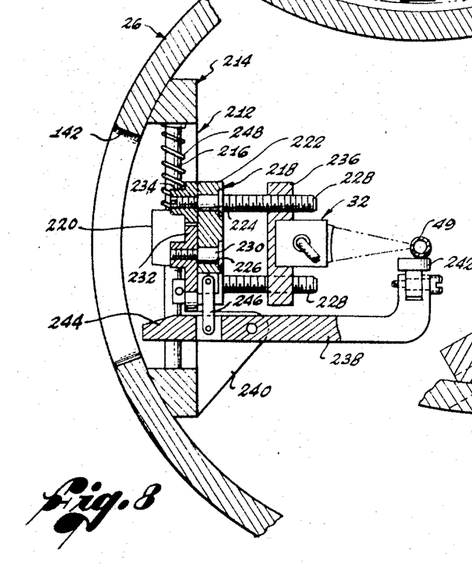
FIGURE 8 is a fragmentary sectional side view taken along the line 8—8 in FIGURE 3 and illustrating the apparatus for self-adjusting the position of one of the transducers within the housing to direct ultrasonic pulses toward bars of different and varying diameter.

As previously indicated, the transducer 32 is supported by the rotatable frame 26 in a manner such that it is self-adjusting to maintain proper focus with respect to bars of different or varying diameter. The mounting arrangement for the transducer 32 is most clearly illustrated in FIGURES 3 and 8.

As represented, the mount 212 for the transducer 32 comprises a mounting frame 214, a pair of slide rods 216 and a carriage 218.

The mounting frame 214 is generally rectangular in shape, extends across the opening 142 and is connected to the inside of the rotatable frame 26.

The slide rods 216 are parallel to each other and extend between opposite sides of the frame 214 in directions normal to the direction of the axis 23.

The carriage 218 is supported for sliding movement along the slide rods 216 and provides support for the transducer 32. In particular, the carriage 218 comprises a pair of sleeve-type bearing mounts 220 extending from the top of a platform 222 and each slidably receiving a different slide rod 216 to carry the platform back and forth along the slide rods. The platform 222 is generally flat and includes three holes 224 equidistant from a central hole 226. The holes 224 are adapted to receive elongated screw members 228 while the central hole 226 is adapted to rotatably receive the stub shaft 230 of a gear 232 lying over the top of the platform 222 and meshing with pinion gears 234 secured to the tops of the screw members 228. Thus arranged, a turning of the gear 232 produces a turning of the pinion gears 234 and a rotation of the screw members 228. The rotation of the screw members 228, in turn, causes a mounting block 236, through which the screw members extend to ride in and out toward the axis 23. The mounting block 236 carries the transducer 32 with its lens focusing untrasonic waves at a point in the bar 49 displaced slightly to one side of the axis 23 whereby ultrasonic vibrations are set up in the bar which travel circumferentially around the bar and upon encountering a discontinuity produce an ultrasonic reflection back to the transducer.

In addition to being adjustable toward and away from the axis 23, the transducer mount 212 is self-adjusting transverse to the axis 23 in response to variations of the diameter of the bar 49 to maintain the transducer 32 in proper alignment with bars of varying diameter. In the illustrated form, the self-adjusting motion is imparted to the transducer 32 by a lever arm 238 pivotally connected between its ends to a flange 240 extending inward from the mounting frame 214 between the slide rods 216. Thus supported, the lever arm 238 is free to swing about an axis parellel to the axis 23 with its inner end 242 moving inward and outward away from the axis 23 to continuously engage the outer surface of the bar 49. The opposite or outer end 244 of the lever arm 238 is connected by links 246 to the carriage 218 such that swinging movement of the lever arm causes the carriage to slide back and forth along the slide rods 216 to self position the transducer 32 relative to the bar 49. In this respect, coil springs 248 extend around the slide rods 216. The springs press against the mounting frame 214 and the bearing mounts 220 and exert forces on the carriage and lever arm 238 causing the inner end 242 to continuously bear against the surface of the bar 49, follow the variations in its diameter and impart self-adjusting motion to the transducer 32.

Figure 7:
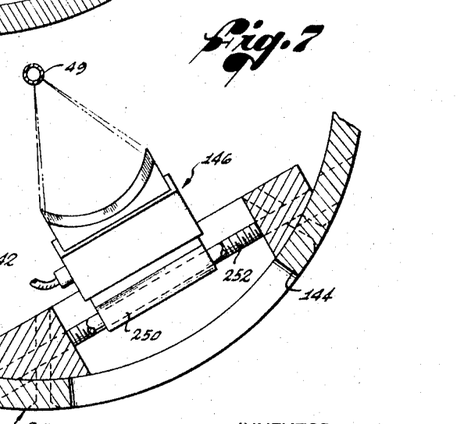
FIGURE 7 is a fragmentary sectional view taken along the line 7—7 in FIGURE 3.

One or more additional transducers may be mounted within the frame 26 for rotation around the axis 23. One such additional transducer is illustrated in FIGURES 3 and 7 and represented by the numeral 146. As illustrated, the transducer 146 is mounted to direct ultrasonic vibrations longitudinally along the bar 49 as it travels along the axis 23. To this end, the transducer 146 is supported by a mounting block 250 connected by a plurality of transverse screw members 252 across the opening 244 in the cylindrical frame 26. The transducer 146 is inclined slightly in the direction of the axis 23 and directs ultrasonic beams downwardly along the longitudinal surface of the bar 49. As with the transducer 32, when the ultrasonic vibrations from the transducer 146 encounter a discontinuity in the bar 49, vibrations are reflected back to the transducer and converted into electrical pulses. The electrical pulses are then capacitively coupled through the electrical connector unit 18 and passed to the receiving equipment (not shown) to provide an indication of the presence and location of the discontinuity in the bar.

To provide such capacitive coupling of the electrical pulses to and from the transducers 32 and 146, the electrical connector unit 18 comprises the stationary and rotatable portions 17 and 19 cooperatively defining parallel plate capacitors. Basically, the capacitors include rotating plates electrically connected to the rotating transducers and stationary plates connected to the transmitting and receiving equipment, and provide means for electrically coupling pulses to and from transducers without generating undesired electrical noise signals with rotation of the frame 26 and guide units 28 and 30 within the chamber 24.

More particularly, and as most clearly illustrated in FIGURE 5, the rotatable portion 19 comprises a sleeve 254 coaxial with the axis 23. The left end of the sleeve 254 is connected by a plurality of axially extending pins 256 to the right end of the collar 154, while, as illustrated in FIGURES 1 and 2, the right end of the sleeve carries a gear 258 mating with a drive gear 260 for turning the sleeve as well as the frame 26. In this regard, the drive gear 260 is carried on a shaft 262 connected to a drive pulley 264 for turning in response to the rotational drive in a motor (not shown).

In turning, the rotatable portion 19 turns within the stationary portion 17 which includes left and right annular plates 266 and 268 connected by screws 270 to a cover sleeve 272. Conventional ball bearing units 274 and 276 are located between the left and right annular plates 266 and 268 and the outer surface of the sleeve 254 to allow the rotatable portion 19 to turn freely within and relative to the stationary portion 17 about the axis 23.

Stationed along and around the sleeve 254 are a plurality of annular discs 274. The discs 274 extend radially outward from the axis 23 and are separated equally from each other by a plurality of spacer rings 276. The combination of the rings 276 and discs 274 is secured together by screws 278 extending axially through the discs and rings into the enlarged left end of the sleeve 254. Preferably, the discs 274 are formed of an insulating material, such as a ceramic, and are coated on opposite faces with layers of an electrical conductive material to define a plurality of first electrical plates 279 insulated from and parallel to each other.

A similar arrangement exists for the stationary portion 17. In particular, a plurality of annular discs 280 extend from the cover sleeve 272 inwardly into the spaces between the discs 274 and are separated from each other by annular spacer rings 282. The combination of the rings 282 and discs 280 is secured together by screws 284 extending axially through the discs and rings into the left annular plate 266. Preferably, the discs 280 are formed of an insulating material, such as a ceramic, and are coated on opposite faces with layers of a metal, such as copper, to define a plurality of second electrical plates 285 insulated from and parallel to each other and each opposite and facing a different first electrical plate.

In the connector unit 18, the second electrical plates 285 form capacitors with the opposing rotating first electrical plates 279 as well as with the opposing second electrical plates. Therefore, to capacitively couple electrical pulses between the transmitting equipment and the transducer 32, a pair of wires 286 connected to the equipment is passed through aligned holes 288, 289 and 290 in the plate 268, discs 280 and spacers 282, and is electrically connected to a pair of opposing second electrical plates 285. Similarly, a pair of wires 292 from the transducer 32 is passed through aligned holes 293 through 297 in the collar 154, connecting pin 256, sleeve 254, spacers 276, and disc 274, and electrically connected to a pair of first electrical plates 279 opposite the second electrical plates. Electrical pulses from the equipment are capacitively coupled from the plates 285 to the plates 279 and applied to the transducer 32. Similarly, electrical pulses from the transducer are applied to the plates 279 and electrically coupled to the opposing plates 285 and applied to the receiving equipment to provide an indication of the presence and location of a discontinuity in the bar 49.

Since there is no physical connection between the rotating first electrical plates 279 and the stationary second electrical plates 285, there is no friction between the plates to produce undesired electrical noise which might interfere with the response from the transducers. Furthermore, the operating characteristics of the electrical connector unit 18 are not altered by changes in the diameter of the bar 49 passing through the unit.

As previously described, the bar 49 in passing through the electrical connector unit 18 is received by the driving unit 22. The driving unit 22 is a mirror image of the driving unit 20, including three radially extending rollers 298 for receiving and drawing the bar from the connector unit 18 along the axis 23 and for driving the bar through the opening in the right wall of the trough 12. Since the driving unit 22 is a mirror image of the unit 20, a complete understanding of the structure and operation of the unit 22 may be had from the description of the unit 20.

The drive for the unit 22, however, is slightly different than the unit 20. As represented in FIGURE 1, the drive assembly comprises a transverse shaft 300 carrying three bevel gears 302, 304, and 306. The bevel gear 302 mates with a bevel gear 308 carried by the shaft 96 while the bevel gears 304 and 306 mate with gears carried by the drive shafts for the rollers of the unit 22. Thus arranged, a turning of the shaft 96 to operate the unit 20 simultaneously operates the unit 22.

From the foregoing description, it is appreciated that the present invention provides an improved rotating transducer-type ultrasonic inspection apparatus which is self-adjusting both in its drive and guiding units, as well as in its positioning for the transducer, to enable the apparatus to inspect tubular or other cylindrical bars of different and varying diameter. This, the ultrasonic inspection apparatus accomplishes with a simple design which is relatively inexpensive to manufacture and which is reliable and rapid acting in its operation.

While a particular form of ultrasonic inspection apparatus has been described in some detail herein, changes and modifications may be made in the illustrated form without departing from the spirit of this invention.

I claim:
1. Ultrasonic inspection apparatus for elongated elements, comprising:
   a support housing defining a fluid confining chamber having left and right side ports for receiving and passing an elongated element through said chamber along an axis between said ports;
   a fluid within said chamber;
   a rotatable frame supported within said chamber for turning about said axis;
   guide means for guiding said elongated element along said axis within said chamber and through said ports;
   ultrasonic transducer means connected to said frame for turning around said axis;
   means for coupling said transducer means and the elongated elements, and automatically operative to adjust the location of said transducer means transversely of said axis in correspondence to changes in cross section of such elongated elements;
   electrical connector means whereby said transducer may be connected to ultrasonic transmitting and receiving equipment, said connector means including a pair of first electrical plates insulated from each other and supported for turning with said frame, a pair of second electrical plates insulated from each other and fixed parallel to and opposite different ones of said first plates to define capacitors with said first plates, and leads from said transducer to said first plates and from said second plates for connection to said equipment;
   and drive means for rotating said frame.

2. The apparatus of claim 1 including:
   a cover for said housing to close the top of same fluid confining chamber;
   means for pumping fluid into said chamber;
   and bleed valve means in said cover for regulating the pressure of fluid in said chamber to prevent entry of air into said chamber during operation of said apparatus.

3. The apparatus of claim 1 including:
   means for driving said element into said left side port along said axis;
   and means for drawing said element from said right side port along said axis.

4. The apparatus of claim 3, wherein said means for driving and drawing said element are self-adjustable to different and varying diameter cylindrical and tubular elements and each includes:
   a stationary tubular slide member for longitudinally receiving said element along said axis;
   a plurality of rollers extending radially from said axis equidistant from each other for engaging and turning with movement of said element along said axis;
   a plurality of arms each supporting a different one of said rollers and each pivotally connected to said slide member for swinging movement toward and away from said axis;
   a wedge member movable along said slide member and including a side inclined outwardly and away from said rollers for engaging ends of said arms opposite said rollers;
   spring means continuously urging said wedge member against said arms;
   and drive means for turning at least one of said rollers.

5. The apparatus of claim 4 including means for adjusting said spring means to control the forces continuously urging said wedge member toward said arms.

6. The apparatus of claim 4, wherein said drive means for said roller includes:
   a driven shaft extending from said roller and having a first gear connected thereto;
   a drive shaft parallel to said axis for turning to rotate said roller;
   a connecting shaft carried by the arm associated with said roller to extend between said drive and driven shafts and having a second gear connected thereto for engaging and turning said first gear;
   and coupling means between said drive shaft and said connecting shaft permitting said connecting shaft to swing and follow movement of said roller toward and away from said axis with said second gear in driving contact with said first gear.

7. The apparatus of claim 1, wherein said transducer means include a plurality of separate transducers operative to direct ultrasonic vibrations transverse to said axis.

8. The apparatus of claim 1 and including a transducer mount comprising:
   a slide connected to said frame and extending in a direction substantially normal to said axis;
   a carriage carrying said transducer means for movement along said slide;
   and a lever arm pivotally connected between its ends to said frame for swinging movement about an axis of rotation parallel to said axis and lying between said slide and said axis, a first end of said lever arm connected to said carriage and a second end adapted to press against said bar parallel to said axis whereby changes in the diameter of said element produce swinging movement of said lever arm to move said carriage and transducer means along said slide.

9. The apparatus of claim 8, wherein said transducer mount further includes means supporting said transducer means for adjustment toward and away from said axis.

10. The apparatus of claim 9, wherein said means supporting said transducer means for adjustment toward and away from said axis includes:
    a pair of screw members extending from said carriage toward said axis;
    a crosspiece receiving said screw members between said carriage and said axis and supporting said transducer means;
    and means for turning said screws to move said crosspiece and said transducer means toward and away from said axis.

11. The apparatus of claim 1, wherein said guide means are connected to said frame adjacent said left and right side ports and are adapted to guide cylindrical and tubular elements of different and varying diameter and each includes:
    three shoes extending radially from said axis and equidistant from each other;
    guide rods extending radially from said shoes and supported for radial sliding movement to carry said shoes toward and away from said axis;
    and a linkage assembly between said guide rods for urging said guide rods toward said axis to press said shoes against said element and for locking to prevent movement of said guide rods when different outward radial forces are applied to different shoes.

12. The apparatus of claim 11, wherein said linkage comprises:
    a pair of first arms of substantially equal length pivotally connected to opposite sides of each guide rod in a plane substantially normal to said rod;
    a plurality of second arms of equal length substantially normal to radii extending from said axis and each pivotally connected at opposite ends to ends of different first arms connected to adjacent guide rods;
    and spring means continuously urging said second arms inwardly toward said axis.

13. The apparatus of claim 12 further including:
    a second rod connected to the mid-portion of each second arm and extending normal thereto and radially inward toward said axis;
    slide bearing mounts connected to said frame for receiving each second rod for radial movement toward and away from said axis;

and wherein said spring means is connected to said frame for urging each second rod radially toward said axis.

14. The apparatus of claim 13, wherein each slide bearing mount includes a sleeve bearing for receiving a second rod and means for adjusting the tension in said spring means to control the radial forces exerted on said second rod.

15. The apparatus of claim 14, wherein each sleeve bearing includes a central annular recess in its inner wall.

16. The apparatus of claim 13, wherein said linkage further includes counterbalance means for counteracting centrifugal forces acting on said shoes with rotation of said frame by exerting increased radial inward forces on said guide rods as the rotational velocity of said frame increases and decreased radial inward forces as the rotational velocity decreases to maintain substantially constant inward radial forces on said shoes against said element.

17. The apparatus of claim 16, wherein said counterbalance means includes:

a third arm pivotally connected to each guide rod for swinging movement in a plane parallel thereto;

bearing means receiving each third arm for supporting same for longitudinal sliding movement;

pivot means connecting each bearing means to said frame for turning in the plane of said third arm;

and a weight connected to an end of each third arm opposite said guide rod.

References Cited

UNITED STATES PATENTS

| 74,244 | 2/1868 | Porter | 137—587 |
|---|---|---|---|
| 2,908,161 | 9/1959 | Bincer | 73—67.8 |
| 3,121,324 | 2/1964 | Cowan | 73—67.8 XR |
| 3,130,577 | 4/1964 | Cowan | 73—67.8 XR |
| 3,228,233 | 1/1966 | Keldenich | 73—67.8 |

RICHARD C. QUEISSER, Primary Examiner

JOHN P. BEAUCHAMP, Assistant Examiner

U.S. Cl. X.R.

73—67.8